(12) United States Patent
Imura

(10) Patent No.: US 12,007,027 B2
(45) Date of Patent: Jun. 11, 2024

(54) SLIDING COMPONENT

(71) Applicant: Eagle Industry Co., Ltd., Tokyo (JP)

(72) Inventor: Tadatsugu Imura, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 273 days.

(21) Appl. No.: 17/603,561

(22) PCT Filed: Apr. 21, 2020

(86) PCT No.: PCT/JP2020/017170
§ 371 (c)(1),
(2) Date: Oct. 13, 2021

(87) PCT Pub. No.: WO2020/218286
PCT Pub. Date: Oct. 29, 2020

(65) Prior Publication Data
US 2022/0196152 A1    Jun. 23, 2022

(30) Foreign Application Priority Data

Apr. 24, 2019   (JP) ................................ 2019-082965

(51) Int. Cl.
F16J 15/16   (2006.01)
(52) U.S. Cl.
CPC .................... F16J 15/164 (2013.01)
(58) Field of Classification Search
CPC ............................ F16J 15/164; F16J 15/16
See application file for complete search history.

(56) References Cited

U.S. PATENT DOCUMENTS

| 3,085,808 A | 4/1963 | Williams | 277/388 |
| 3,232,680 A | 2/1966 | Clark | 384/110 |
| 3,410,565 A | 11/1968 | Williams | 277/348 |
| 3,499,653 A | 3/1970 | Gardner | 277/27 |
| 3,527,465 A | 9/1970 | Guinard | 277/400 |
| 3,656,227 A | 4/1972 | Weinand | 29/530 |
| 3,804,424 A | 4/1974 | Gardner | 277/27 |
| 3,905,606 A * | 9/1975 | Florjancic | F16J 15/34 277/399 |
| 4,406,466 A | 9/1983 | Geary, Jr. | 277/347 |

(Continued)

FOREIGN PATENT DOCUMENTS

| CN | 101749431 | 6/2010 | ............... F16J 15/34 |
| DE | 36 19 489 | 12/1987 | ............... F16J 15/34 |

(Continued)

OTHER PUBLICATIONS

Korean Office Action issued in related application 10-2021-7036306, dated Mar. 21, 2023, with English translation, 11 pages.

(Continued)

*Primary Examiner* — Eugene G Byrd
(74) *Attorney, Agent, or Firm* — HAYES SOLOWAY P.C.

(57) ABSTRACT

Provided is a sliding component capable of exhibiting stable sliding performance under various conditions. The sliding component includes a first ring and a second ring which are provided with facing surfaces facing each other and relatively rotated upon a drive of a rotating machine. At least the first ring is provided with a curved surface portion formed in a convex shape and forming at least a part of the facing surface of the first ring.

17 Claims, 7 Drawing Sheets

(56) References Cited

U.S. PATENT DOCUMENTS

| | | | |
|---|---|---|---|
| 4,407,512 A * | 10/1983 | Trytek | F16J 15/3412 277/408 |
| 4,486,026 A | 12/1984 | Furumura et al. | 277/80 |
| 4,799,693 A * | 1/1989 | Johnston | F16J 15/3416 277/400 |
| 4,836,561 A * | 6/1989 | Lebeck | F16J 15/3428 277/400 |
| 5,092,612 A | 3/1992 | Victor | 277/400 |
| 5,201,531 A | 4/1993 | Lai | F16J 15/3412 |
| 5,222,743 A | 6/1993 | Goldswain | 277/400 |
| 5,246,295 A | 9/1993 | Ide | F16C 17/06 |
| 5,441,283 A | 8/1995 | Pecht et al. | 277/96.1 |
| 5,492,341 A | 2/1996 | Pecht | 277/400 |
| 5,498,007 A | 3/1996 | Kulkarni | 277/366 |
| 5,501,470 A | 3/1996 | Fuse | 277/400 |
| 5,556,111 A | 9/1996 | Sedy | 277/96.1 |
| 5,702,110 A | 12/1997 | Sedy | |
| 5,895,051 A | 4/1999 | Bowers | B62D 5/22 |
| 6,446,976 B1 | 9/2002 | Key | 277/367 |
| 6,575,470 B1 * | 6/2003 | Gacek | F16J 15/3412 277/408 |
| 9,587,745 B2 | 3/2017 | Itadani et al. | F16J 15/3412 |
| 9,829,109 B2 | 11/2017 | Itadani et al. | F16J 15/3412 |
| 9,845,887 B2 * | 12/2017 | Hoppe | F16J 15/344 |
| 9,951,873 B2 | 4/2018 | Inoue et al. | F16J 15/34 |
| 10,072,759 B2 | 9/2018 | Inoue et al. | F16J 15/34 |
| 10,113,648 B2 | 10/2018 | Inoue et al. | F16J 15/342 |
| 10,487,948 B2 | 11/2019 | Inoue et al. | F16J 15/342 |
| 10,495,228 B2 | 12/2019 | Itadani et al. | F16J 15/34 |
| 10,704,417 B2 | 7/2020 | Tokunaga et al. | F01D 25/16 |
| 10,781,924 B2 | 9/2020 | Inoue et al. | F16J 15/342 |
| 10,883,603 B2 | 1/2021 | Inoue et al. | F16J 15/342 |
| 10,883,604 B2 | 1/2021 | Inoue et al. | F16J 15/342 |
| 2002/0093141 A1 | 7/2002 | Wang | 277/358 |
| 2003/0178781 A1 | 9/2003 | Tejima | |
| 2004/0080112 A1 | 4/2004 | Tejima | 277/306 |
| 2005/0212217 A1 | 9/2005 | Tejima | 277/399 |
| 2008/0100001 A1 | 5/2008 | Flaherty | 277/400 |
| 2008/0272552 A1 | 11/2008 | Zheng | 277/400 |
| 2010/0066027 A1 | 3/2010 | Vasagar | 277/350 |
| 2011/0101616 A1 | 5/2011 | Teshima | 277/358 |
| 2013/0209011 A1 | 8/2013 | Tokunaga | F16C 32/0633 |
| 2015/0123350 A1 | 5/2015 | Itadani | 277/400 |
| 2015/0377297 A1 | 12/2015 | Tokunaga et al. | F16C 33/748 |
| 2016/0033045 A1 | 2/2016 | Itadani et al. | F16J 15/3412 |
| 2017/0234431 A1 | 8/2017 | Katori et al. | F16J 15/3412 |
| 2018/0238452 A1 * | 8/2018 | Shaw | F16J 15/164 |
| 2019/0178386 A1 | 6/2019 | Arai | F16J 15/3496 |
| 2019/0301522 A1 | 10/2019 | Negishi et al. | F16C 17/026 |

FOREIGN PATENT DOCUMENTS

| | | | |
|---|---|---|---|
| EP | 2570614 | 3/2013 | F01D 11/02 |
| EP | 2626604 | 8/2013 | F16J 15/34 |
| JP | 36-6305 | 5/1961 | |
| JP | S49-33614 | 9/1974 | F16J 15/34 |
| JP | S54-77305 | 6/1979 | B06B 9/10 |
| JP | S55-177549 | 12/1980 | F16J 15/16 |
| JP | 58-109771 | 6/1983 | F16J 15/34 |
| JP | 58-137667 | 8/1983 | F16J 15/40 |
| JP | S59-58252 | 4/1984 | F16J 15/34 |
| JP | 6037463 | 2/1985 | F16J 15/34 |
| JP | S60-107461 | 7/1985 | B63H 23/36 |
| JP | S6182177 | 5/1986 | F16J 15/34 |
| JP | S63-033027 | 3/1988 | F16C 33/46 |
| JP | S63-190975 | 8/1988 | F16J 15/34 |
| JP | H01133572 | 9/1989 | F16J 15/34 |
| JP | 2-236067 | 9/1990 | F16J 15/34 |
| JP | H04-73 | 1/1992 | F16J 15/34 |
| JP | H04-145267 | 5/1992 | F16J 15/34 |
| JP | H07-55016 | 3/1995 | F16J 15/34 |
| JP | H08-89489 | 4/1996 | A61B 5/05 |
| JP | H09-503276 | 3/1997 | F16J 15/34 |
| JP | H09-329247 | 12/1997 | F16J 15/34 |
| JP | H10-38093 | 2/1998 | F16J 15/34 |
| JP | H10-281299 | 10/1998 | F16J 15/34 |
| JP | 2003-343741 | 12/2003 | F16J 15/34 |
| JP | 2005-188651 | 7/2005 | F16J 15/34 |
| JP | 2006-022834 | 1/2006 | F16J 15/34 |
| JP | 2009-250378 | 10/2009 | F16J 15/34 |
| JP | 2012-2295 | 1/2012 | F16J 15/34 |
| JP | 5271858 | 5/2013 | F16J 15/34 |
| JP | 2016-80090 | 5/2016 | F16J 15/34 |
| JP | 2017-141961 | 8/2017 | F16J 15/34 |
| JP | 6444492 | 12/2018 | F16J 15/34 |
| WO | WO 95/06832 | 3/1995 | F16J 15/34 |
| WO | WO 2012/046749 | 4/2012 | F16J 15/34 |
| WO | WO 2014/148316 | 9/2014 | F16J 15/34 |
| WO | WO 2016/035860 | 3/2016 | F16J 15/34 |
| WO | WO 2016/167262 | 10/2016 | F16J 15/34 |
| WO | WO 2017/002774 | 1/2017 | F16J 15/34 |
| WO | WO 2018/034197 | 2/2018 | F16J 15/34 |
| WO | WO 2018/105505 | 6/2018 | F16J 15/34 |

OTHER PUBLICATIONS

European Search Report issued in related application No. 20794826.6, dated Nov. 14, 2022, 6 pages.

International Preliminary Report on Patentability issued in application No. PCT/JP2020/017170, dated Nov. 4, 2021 (6 pgs).

Definition of groove by Merriam Webster.

Chinese Office Action issued in application No. 201380070532.6 (with translation), dated Jan. 28, 2016 (13 pgs).

Chinese Office Action issued in application No. 201380070532.6 (with translation), dated Sep. 20, 2016 (12 pgs).

Second Office Action issued by the State Intellectual Property Office of China, dated Aug. 29, 2016, for Chinese counterpart application No. 201480002574.0, 8 pages.

First Notification of Reason for Refusal issued by the State Intellectual Property Office of China, dated Dec. 24, 2015, with a search report for Chinese counterpart application No. 201480002574.0, 11 pages.

Office Action issued in U.S. Appl. No. 14/431,733, dated Apr. 29, 2016 (22 pgs).

Office Action issued in U.S. Appl. No. 14/431,733, dated Aug. 18, 2017 (13 pgs).

Office Action issued in U.S. Appl. No. 14/431,733, dated Mar. 31, 2017 (14 pgs).

Office Action issued in U.S. Appl. No. 14/431,733, dated Oct. 6, 2016 (12 pgs).

Office Action issued in U.S. Appl. No. 15/419,989, dated Jan. 26, 2018 (20 pgs).

Office Action issued in U.S. Appl. No. 15/419,970, dated May 11, 2018 (17 pgs).

Office Action issued in U.S. Appl. No. 15/419,970, dated Jan. 23, 2018 (21 pgs).

Office Action issued in U.S. Appl. No. 15/842,862, dated Jun. 5, 2019 (37 pgs).

Office Action issued in U.S. Appl. No. 15/842,855, dated Mar. 12, 2020 (11 pgs).

Office Action issued in U.S. Appl. No. 15/842,855, dated Jun. 29, 2020, 16 pages.

Office Action issued in U.S. Appl. No. 15/842,858, dated Mar. 31, 2020 (10 pgs).

Office Action issued in U.S. Appl. No. 15/842,859, dated Apr. 8, 2020 (12 pgs).

Notice of Allowance issued in U.S. Appl. No. 15/419,970, dated Aug. 9, 2018 (16 pgs).

Notice of Allowance issued in U.S. Appl. No. 14/431,733, dated Feb. 23, 2018 (22 pgs).

Notice of Allowance issued in U.S. Appl. No. 15/419,989, dated Jul. 23, 2018 (11 pgs).

Notice of Allowance issued in U.S. Appl. No. 15/842,862, dated Sep. 30, 2019, 15 pages.

Japanese Office Action (w/translation) issued in application 2018-159877, dated Jun. 13, 2019 (7 pgs).

International Search Report issued in application No. PCT/JP2013/084029, dated Mar. 25, 2014 (4 pgs).

(56) References Cited

OTHER PUBLICATIONS

International Preliminary Report on Patentability issued in application No. PCT/JP2013/084029, dated Nov. 5, 2015 (8 pgs).
International Search Report and Written Opinion issued in PCT/JP2014/050402, dated Feb. 10, 2014, with English translation, 12 pages.
International Preliminary Report on Patentability issued in PCT/JP2014/050402, dated Jul. 21, 2015, 4 pages.
International Search Report and Written Opinion issued in PCT/JP2019/045728, dated Dec. 17, 2019, with English translation, 13 pages.
International Preliminary Report on Patentability issued in PCT/JP2019/045728, dated May 25, 2021, 7 pages.
International Search Report and Written Opinion issued in PCT/JP2019/047890, dated Feb. 10, 2020, with English translation, 13 pages.
International Preliminary Report on Patentability issued in PCT/JP2019/047890, dated Aug. 10, 2021, 7 pages.
International Search Report and Written Opinion issued in PCT/JP2019/049870, dated Mar. 10, 2020, with English translation, 13 pages.
International Preliminary Report on Patentability issued in PCT/JP2019/049870, dated Jun. 16, 2021, 7 pages.
International Search Report and Written Opinion issued in PCT/JP2020/005260, dated Apr. 7, 2020, with English translation, 16 pages.
International Preliminary Report on Patentability issued in PCT/JP2020/005260, dated Aug. 10, 2021, 9 pages.
International Search Report and Written Opinion issued in PCT/JP2020/006421, dated Apr. 21, 2020, with English translation, 13 pages.
International Preliminary Report on Patentability issued in PCT/JP2020/006421, dated Aug. 10, 2021, 6 pages.
International Search Report and Written Opinion issued in PCT/JP2020/017170, dated Jun. 2, 2020, with English translation, 13 pages.
European Official Action issued in related application No. 20794826.6, dated Jul. 19, 2023, 5 pages.

* cited by examiner

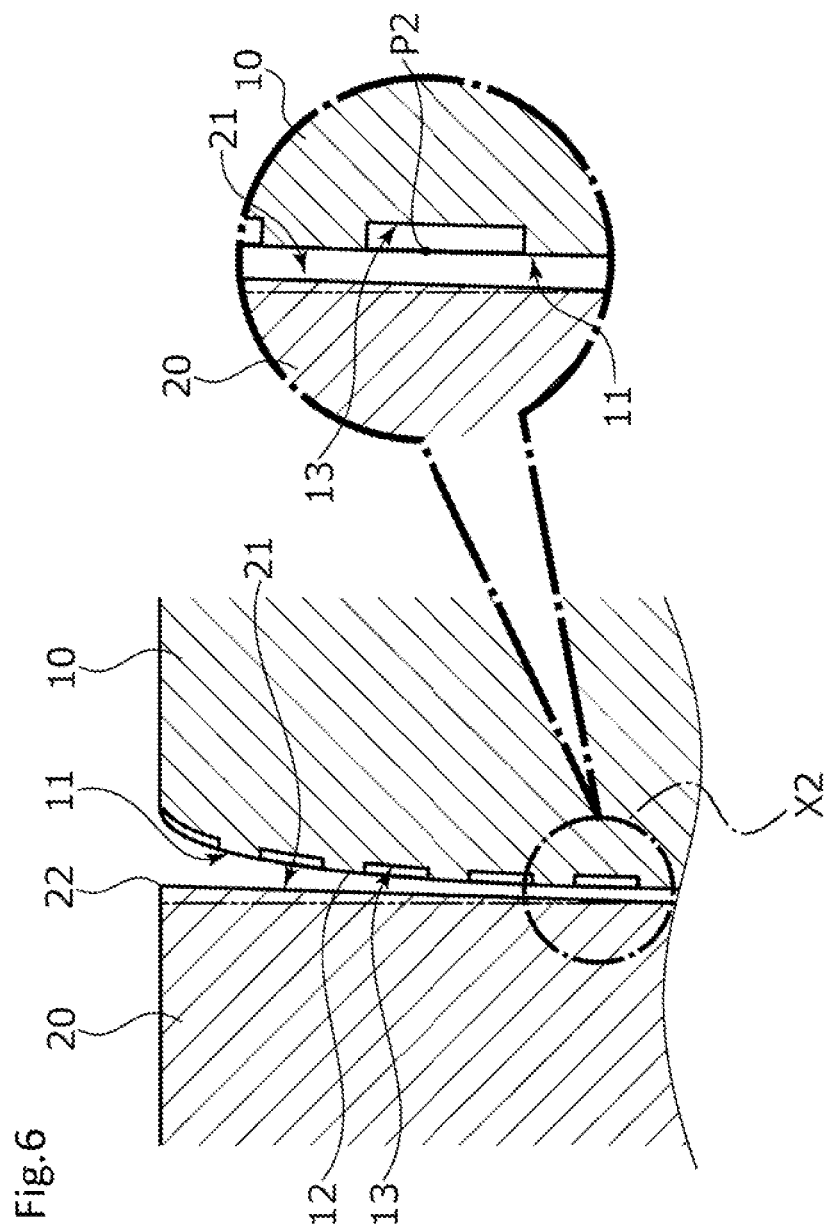

SLIDING COMPONENT

TECHNICAL FIELD

The present invention relates to sliding components rotating relative to each other and used for a shaft sealing device that shaft-seals a rotary shaft of a rotating machine in a seal field such as an automobile and a general industrial machine or a bearing of a rotating machine in a bearing field such as an automobile and a general industrial machine.

BACKGROUND ART

In the related art, a mechanical seal is an example of a shaft sealing device that shaft-seals a rotary shaft of a rotating machine such as a pump and a turbine, prevents sealing target fluid leakage, and includes two components configured to rotate relative to each other and configured such that flat end surfaces slide with each other. The mechanical seal includes a stationary seal ring as a sliding component fixed to a housing and a rotating seal ring as a sliding component fixed to and rotating together with the rotary shaft. One of the stationary and rotating seal rings is urged in the direction of the other seal ring by urging means, and the sliding surfaces thereof are rotated relative to each other. As a result, the gap between the housing and the rotary shaft is shaft-sealed (see, for example, Patent Citation 1).

In the mechanical seal, it is possible to secure an effective facing region between the seal rings and exhibit predetermined sealing performance by the facing surfaces of the seal rings facing each other in parallel.

CITATION LIST

Patent Literature

Patent Citation 1: JP 5271858 B2 (Page 4, FIG. 2)

SUMMARY OF INVENTION

Technical Problem

By the way, in the mechanical seal, the facing surface of the rotating-side seal ring may be deformed so as to axially tilt, though slightly, due to the inertial force of rotation or the like. When the deformation occurs in the mechanical seal described in Patent Citation 1, the corner portion constituting the outer or inner peripheral edge portion of one of the seal rings becomes close to the flat facing surface of the other facing seal ring. Accordingly, the corner portion becomes the closest part, the point closer to the inner diameter side or the outer peripheral side than the inner corner portion of the facing surface of one of the seal rings is largely separated from the facing surface of the other seal ring, and the effective facing region between the seal rings may become extremely small in the radial direction. In other words, the problem that stable sealing performance cannot be exhibited arises in a case where the deformation of the rotating-side seal ring is large under conditions such as the presence of a large load and a high rotation speed whereas the facing surfaces of the seal rings face each other in parallel and predetermined sealing performance can be exhibited in a case where the deformation of the rotating-side seal ring is small.

The present invention has been made in view of such problems, and an object of the present invention is to provide a sliding component capable of exhibiting stable sliding performance under various conditions.

Solution to Problem

In order to solve the above problem, a sliding component according to the present invention is a sliding component comprising a first ring and a second ring which are provided with facing surfaces facing each other and relatively rotated upon a drive of a rotating machine, wherein at least the first ring is provided with a curved surface portion formed in a convex shape and constituting at least a part of the facing surface of the first ring. According to the aforesaid feature of the present invention, it is possible to secure an effective facing region in the radial direction between the first and second rings and exhibit stable sliding performance under various undesirable conditions including a condition that the facing surface of one of the first and second rings is deformed so as to axially tilt due to the inertial force of rotation or the like and as a result the convex curved surface portion on the facing surface of the first ring and the facing surface of the second facing ring close to each other.

It may be preferable that the curved surface portion is formed over a circumferential direction of the facing surface of the first ring. According to this preferable configuration, an effective facing region can be secured over the entire circumference.

It may be preferable that the curved surface portion is formed at one or both of an outer diameter end and an inner diameter end of the first ring. According to this preferable configuration, it is possible to secure an effective facing region in the radial direction between the first and second rings, even if the second ring is substantially deformed at the outer or inner diameter end thereof. In addition, even if the facing surfaces come into contact with each other, the contact can be surface contact without being line contact.

It may be preferable that the second ring is provided with a curved surface portion formed in a concave shape and constituting at least a part of the facing surface of the second ring, and the curved surface portion of the first ring is smaller in radius of curvature than the curved surface portion of the second ring. According to this preferable configuration, it is possible to reliably secure an effective facing region in the radial direction between the first and second rings with the curved surface portions close to each other.

It may be preferable that the first ring provided with the curved surface portion is disposed on a stationary side of the rotating machine. According to this preferable configuration, it is easy to predict the shape of the first ring as a stationary-side ring during use, and thus it is possible to secure an effective facing region with high accuracy with respect to the degree of deformation of the rotating-side ring.

It may be preferable that a functional groove is formed in one or both of the curved surface portion of the first ring and the facing surface of the second ring facing the curved surface portion of the first ring, the functional groove is opened at an outer diameter side or an inner diameter side of the sliding component. According to this preferable configuration, it is possible to reliably exhibit a function such as dynamic pressure generation by the functional groove in the effective facing region secured in the radial direction between the first and second rings.

It may be preferable that in the first ring provided with the functional groove, at least another functional groove is formed, the functional grooves have depths equal to each other and each has a bottom surface parallel to a surface shape of the curved surface portion, and the functional grooves overlap with each other in a radially directional view. According to this preferable configuration, the function of the functional grooves can be exhibited regardless of the degree of deformation of the rotating-side ring.

It may be preferable that the curved surface portion is constituted by a plurality of minute step portions radially formed along a circumferential direction of the facing surface of the first ring. According to this preferable configuration, a fluid is held in the plurality of step portions formed in the radial direction, a fluid film is easily formed between the facing surfaces of the first and second rings, and high slidability can be ensured.

BRIEF DESCRIPTION OF DRAWINGS

FIG. 6 is a partially enlarged cross-sectional view illustrating the deformation of the rotating seal ring attributable to rotary shaft rotation different in rotation speed from FIG. 5.

DESCRIPTION OF EMBODIMENTS

Modes for implementing the sliding component according to the present invention will be described below based on embodiments.

First Embodiment

The sliding component according to a first embodiment of the present invention will be described with reference to FIGS. 1 to 6. It should be noted that a mode in which the sliding component is a mechanical seal will be described as an example in the present embodiment. In addition, in the following description, the inner diameter side of the sliding component constituting the mechanical seal is a leak side and an atmospheric side (i.e., low-pressure side) as a gas side and the outer diameter side is a sealing target liquid side (i.e., high-pressure side).

Figure 1:
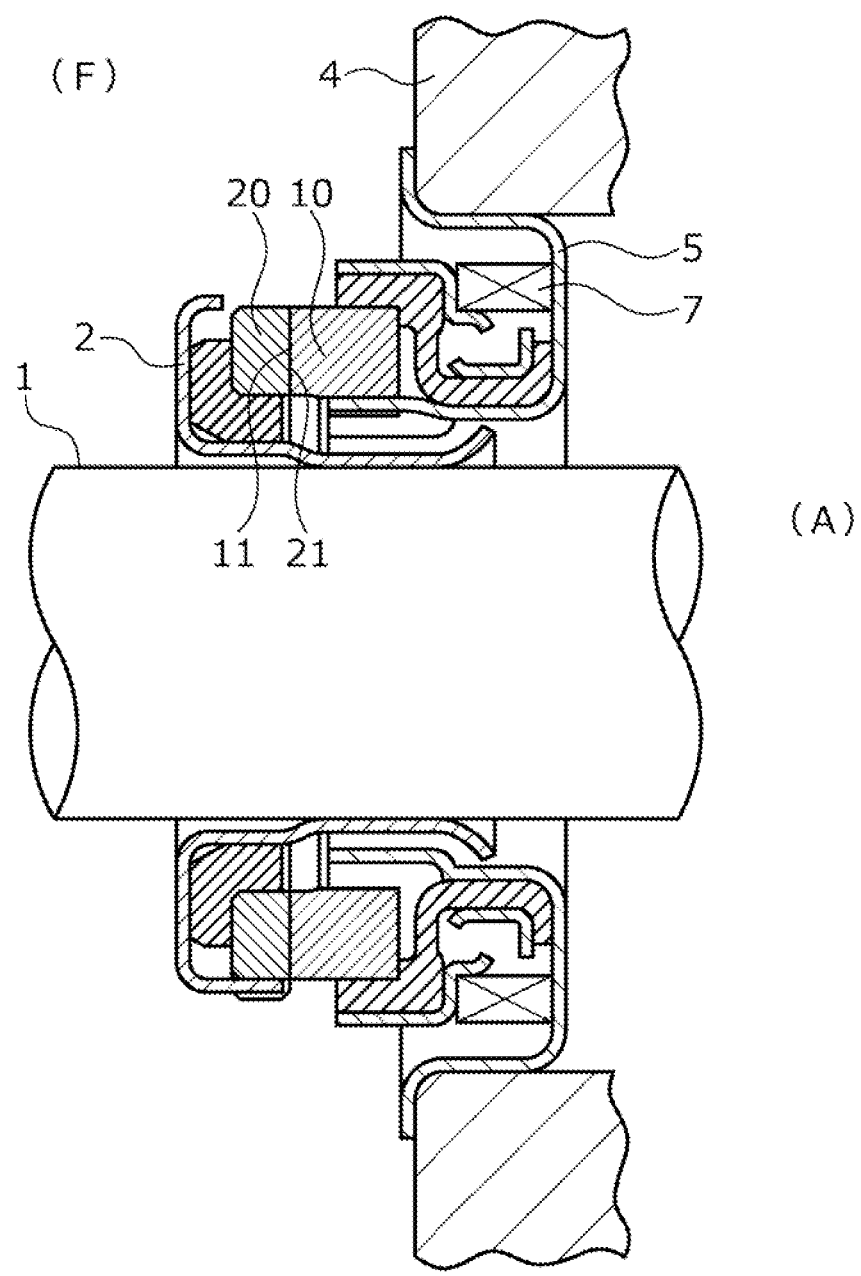
FIG. 1 is a cross-sectional view illustrating a mechanical seal including a sliding component according to a first embodiment of the present invention.

The mechanical seal for a general industrial machine illustrated in FIG. 1 is an inside-type mechanical seal that seals a sealing target liquid F to leak from the outer diameter side toward the inner diameter side of a sliding surface. The mechanical seal mainly includes a rotating seal ring 20, which is a ring as an annular sliding component provided on a rotary shaft 1 in a state of being rotatable together with the rotary shaft 1 via a sleeve 2, and a stationary seal ring 10, which is a ring as an annular sliding component provided on a seal cover 5 fixed to a housing 4 of an attachment target device in a non-rotating state and a state of being movable in the axial direction. A facing surface 11 of the stationary seal ring 10 and a facing surface 21 of the rotating seal ring 20 slide closely with each other by a bellows 7 urging the stationary seal ring 10 in the axial direction.

The stationary seal ring 10 and the rotating seal ring 20 are typically formed of a combination of SiC (hard material) or a combination of SiC (hard material) and carbon (soft material). However, the present invention is not limited thereto and any sliding material can be applied insofar as it is used as a sliding material for a mechanical seal. It should be noted that the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (coating material), a composite material, and the like can also be applied.

Figure 2:
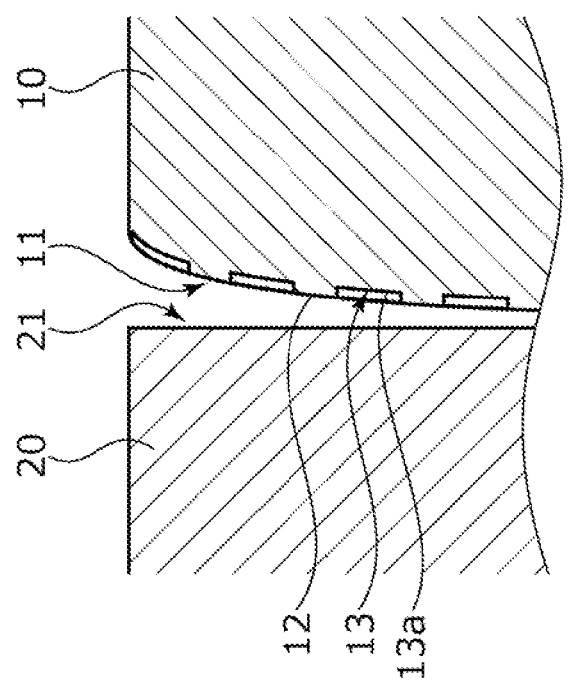
FIG. 2 is a cross-sectional view illustrating the curved surface shape formed on the facing surface of a stationary seal ring in the first embodiment.

As illustrated in FIG. 2, the facing surface 11 of the stationary seal ring 10 forms a curved surface portion formed in a convex shape in the facing direction in the radial cross section on one side across the rotation center, that is, in the direction toward the facing surface 21 of the rotating seal ring 20. The shape of the curved surface portion is a convex curved surface shape gradually separated from the rotating seal ring 20 toward the outer diameter end from the inner diameter end of the facing surface 11. This curved surface shape is obtained by pre-removing the part where the facing surface 21 of the rotating seal ring 20 becomes obliquely close in view of the deformation of the rotating seal ring 20 during rotation to be described later.

It should be noted that the deformation of the facing surface 21 of the rotating seal ring 20 in the direction toward the facing surface 11 of the stationary seal ring 10 depends on the rotation speed and the size of the rotating seal ring 20. For example, the deformation is approximately 2 to 9 µm at a rotation speed of 45 krpm. Accordingly, it is preferable that the curved surface shape of the facing surface 11 of the stationary seal ring 10 is formed such that the height difference between the inner diameter end of the facing surface 11 closest to the facing surface 21 and the outer diameter end of the facing surface 11 farthest from the facing surface 21 of the rotating seal ring 20 during non-operation is approximately 2 to 9 µm.

As described above, the facing surface 11 has a convex curved surface shape gradually separated from the rotating seal ring 20 from the inner diameter end to the outer diameter end. Accordingly, the facing surface 11 has a particularly large inclination with respect to the direction in which the outer diameter side of the facing surface 11 is orthogonal to the rotary shaft 1 and the inclination with respect to the direction in which the inner diameter side of the facing surface 11 is orthogonal to the rotary shaft 1 is smaller than on the outer diameter side of the facing surface 11. In other words, the facing surface 11 has a small radius of curvature on the outer diameter side and a large radius of curvature on the inner diameter side. In other words, the facing surface 11 has a large curvature on the outer diameter side and a small curvature on the inner diameter side.

Figure 3:
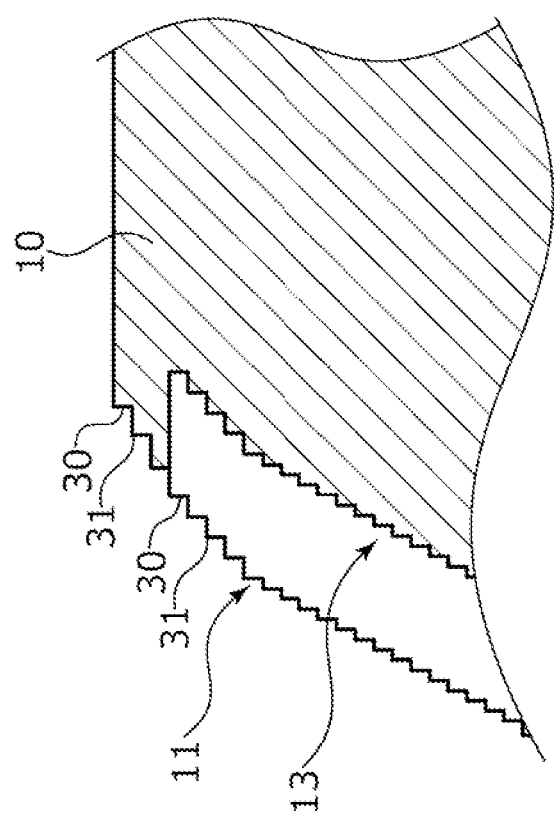
FIG. 3 is a cross-sectional view illustrating the surface shape of the curved surface shape from a microscopic viewpoint in the first embodiment.

In addition, the curved surface shape can be formed by micromachining the mirror-finished flat facing surface 11 by laser machining or the like. The laser machining is performed by irradiating the mirror-finished stationary seal ring 10 with laser while performing a relative laser movement in the circumferential direction, and a method can be adopted in which the facing surface 11 is scraped over the entire circumference by changing the depth in the axial direction by shifting to the inner diameter or the outer diameter. According to this, a plurality of step portions 30 over the entire circumference are formed side by side in the radial direction as illustrated in FIG. 3 and the curved surface-shaped facing surface 11 is configured by connecting corner portions 31 sandwiched between the step portions 30. In other words, the facing surface 11 has a radial curvature from a macroscopic viewpoint while the minute step portion 30 is formed in the radial direction from a microscopic viewpoint.

Figure 4:
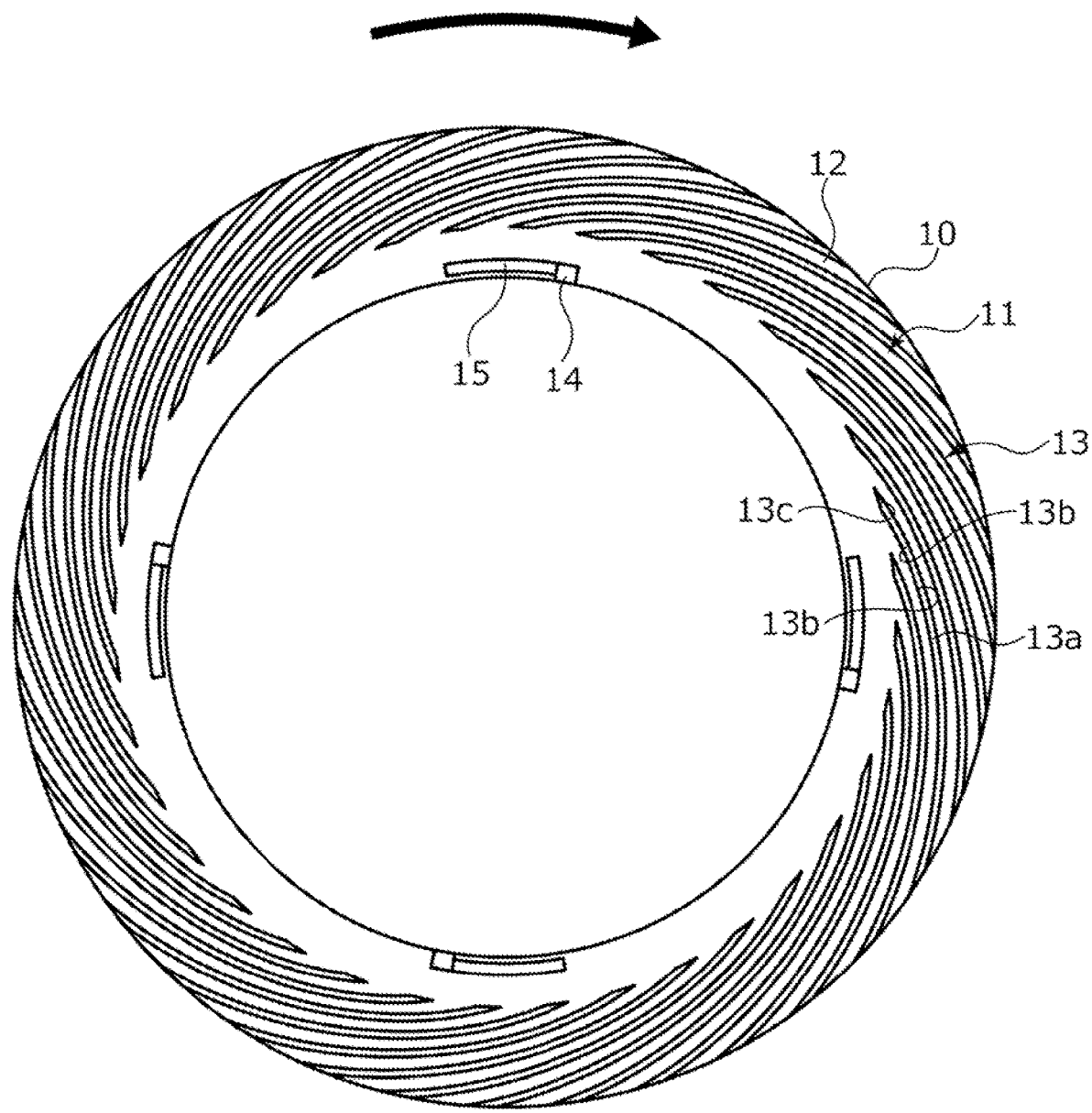
FIG. 4 is a diagram in which the facing surface of the stationary seal ring is viewed from the axial direction in the first embodiment.

In addition, as illustrated in FIGS. 2 and 4, dynamic pressure generation grooves 13 as a plurality of functional grooves are formed at equal intervals in the circumferential direction and the radial direction on the outer diameter side of the facing surface 11 of the stationary seal ring 10 and fluid introduction grooves 14 as a plurality of functional grooves and positive pressure generation grooves 15 as a plurality of functional grooves are formed at equal intervals in the circumferential direction on the inner diameter side of the facing surface 11. The dynamic pressure generation groove 13 is an equiangular spiral, and the part other than the dynamic pressure generation groove 13 on the outer diameter side of the facing surface 11, that is, the part between the dynamic pressure generation grooves 13 is a land 12 forming a curved surface in the radial direction. In addition, the fluid introduction groove 14 is a groove for introducing a fluid from the inner diameter side and the positive pressure generation groove 15 is a circumferentially extending groove connected to the fluid introduction groove 14. In addition, the inner diameter side beyond the dynamic pressure generation groove 13 is a land with a large radius of curvature except for the fluid introduction groove 14 and the positive pressure generation groove 15. It should be noted that the number of the dynamic pressure generation grooves 13 can be freely changed in accordance with the environment of use.

As illustrated in FIGS. 2 and 4, each dynamic pressure generation groove 13 has a bottom surface 13a, which is a curved surface parallel to the surface shape of the land 12 as a curved surface, and the dynamic pressure generation grooves 13 are formed to have the same depth. A dynamic pressure is generated in the dynamic pressure generation groove 13 when the stationary seal ring 10 and the rotating seal ring 20 are rotated relative to each other as described later. It should be noted that the bottom surface 13a of the dynamic pressure generation groove 13 does not hinder fine recess provision in the flat surface or formation for inclination with respect to the land 12 although the bottom surface 13a of the dynamic pressure generation groove 13 is formed in a curved surface shape parallel to the land 12.

The dynamic pressure generation groove 13 can be formed by re-performing micromachining by laser on the facing surface 11 laser-machined into a curved surface shape. The dynamic pressure generation groove 13 is surrounded by the four surfaces of two surfaces 13b disposed side by side when viewed from the axial direction and forming circular arc-shaped side walls, a wall portion 13c forming the wall at the inner diameter end, that is, the terminal end extending while crossing the circular arc-shaped surfaces 13b, and the bottom surface 13a parallel to the facing surface 11. The outer diameter end of the dynamic pressure generation groove 13 is open to the outer diameter side of the dynamic pressure generation groove 13 (see FIG. 4).

As illustrated in FIG. 2, the facing surface 21 of the rotating seal ring 20 is formed and disposed so as to be a flat surface orthogonal to the axial direction of the rotary shaft 1 when the rotary shaft 1 is stationary without operation.

Next, the operation of a general industrial machine during non-operation and operation will be described. As illustrated in FIG. 2, during the non-operation of the general industrial machine and non-rotation of the rotating seal ring 20, the rotating seal ring 20 is not deformed and the facing surface 21 of the rotating seal ring 20 and the facing surface 11 of the stationary seal ring 10 are in contact with each other on the inner diameter side in the mechanical seal of the present embodiment.

During the operation of the general industrial machine, the sealing target liquid F is taken into the dynamic pressure generation groove 13 to result in a state where the facing surface 21 of the rotating seal ring 20 and the facing surface 11 of the stationary seal ring 10 are slightly separated by the positive pressure generated around the wall portion 13c, which is the terminal end of the dynamic pressure generation groove 13. The state is the so-called non-contact state of the facing surfaces and leads to friction reduction.

During the operation of the general industrial machine, the rotating seal ring 20 may be deformed due to, for example, the inertial force attributable to the rotation of the rotary shaft 1, the stress attributable to the resistance or load of a component of the general industrial machine such as an impeller rotating with the rotary shaft 1, or a thermal factor attributable to sliding heat generation.

Figure 5:
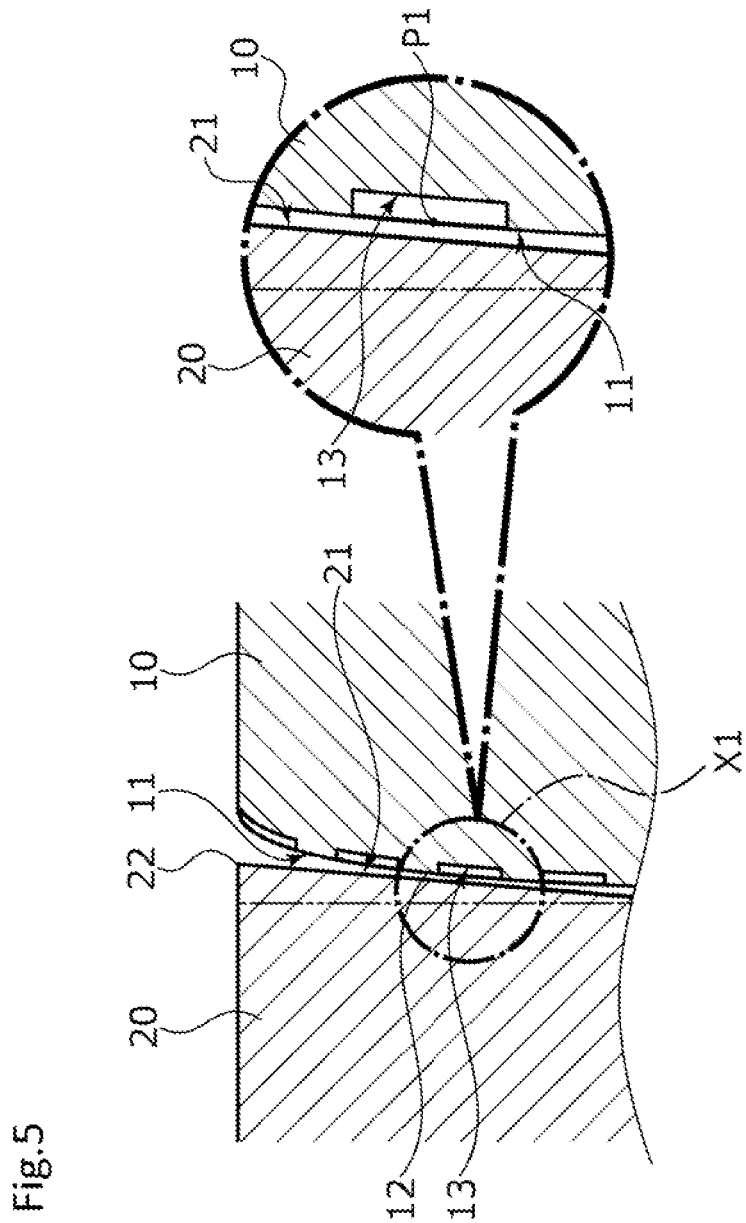
FIG. 5 is a partially enlarged cross-sectional view illustrating the deformation of a rotating seal ring attributable to the rotation of a rotary shaft in the first embodiment.

For example, the rotating seal ring 20 may be deformed so as to tilt in the direction toward the stationary seal ring 10 toward the outer diameter side, which is the free end of the rotating seal ring 20. As illustrated in FIG. 5, in this case, the outer diameter side of the facing surface 21 of the rotating seal ring 20 becomes close to the outer diameter side of the facing surface 11 of the stationary seal ring 10. It should be noted that the two-dot chain line in FIG. 5 indicates the facing surface 21 of the rotating seal ring 20 during the non-operation.

The facing surface 11 of the stationary seal ring 10 has a shape in which the part where the facing surface 21 of the rotating seal ring 20 becomes obliquely close is pre-removed in view of the deformation of the rotating seal ring 20 during the rotation. Accordingly, as is clear from FIG. 5, the facing surface 21 of the rotating seal ring 20 at this time becomes closest to the facing surface 11 of the stationary seal ring 10 in a region X1, which is closer to the inner diameter side than a sharp corner portion 22 at the tip positioned at the outer diameter end, and thus it is possible to prevent damage to the corner portion 22 and the facing surface 11 that the corner portion 22 faces.

In addition, the facing surface 11 of the stationary seal ring 10 has a convex curved surface shape. Accordingly, in a state where the facing surface 11 of the stationary seal ring 10 and the facing surface 21 of the rotating seal ring 20 facing the facing surface 11 of the stationary seal ring 10 are close to each other, a part of the facing surface 11 of the stationary seal ring 10 at an angle close to the inclination angle resulting from the deformation of the facing surface 21 of the rotating seal ring 20 becomes almost parallel to the facing surface 21 of the inclined rotating seal ring 20. Specifically, the facing surface 11 of the stationary seal ring 10 has a curved surface shape around a closest part P1, which is closest to the facing surface 21 of the rotating seal ring 20 on the facing surface 11 of the stationary seal ring 10, and even on both radial sides across the closest part P1, and thus a part of the facing surface 11 of the stationary seal ring 10 becomes almost parallel to the facing surface 21 of the inclined rotating seal ring 20 without being significantly separated from the facing surface 21 of the rotating seal ring 20 and an effective facing region can be secured in the radial direction between the facing surfaces 11 and 21 of the stationary seal ring 10 and the rotating seal ring 20. As a result, the stationary seal ring 10 and the rotating seal ring 20 are capable of exhibiting stable sealing performance under various conditions.

It should be noted that the degree of deformation of the rotating seal ring 20 varies depending on external factors. For example, in a case where the inclination of the facing surface 21 of the rotating seal ring 20 is smaller than in FIG. 5 as illustrated in FIG. 6, a closest part P2 is positioned in a region X2, which is closer to the inner diameter side than the closest part P1 in the state illustrated in FIG. 5, and a part of the facing surface 11 of the stationary seal ring 10 including the closest part P2 becomes almost parallel to the facing surface 21 of the inclined rotating seal ring 20.

In this manner, the facing surface 11 of the stationary seal ring 10 has a convex curved surface shape gradually separated from the rotating seal ring 20 toward the outer diameter end from the inner diameter end, and thus it is possible to secure an effective facing region in the radial direction at all times regardless of the inclination angle of the facing surface 21 attributable to the difference in the degree of deformation of the rotating seal ring 20. In other words, the present invention can be used for general purposes in, for example, general industrial machines and automobiles of various specifications.

In addition, the facing surface 11 has a curved surface shape from the inner diameter end to the outer diameter end and is capable of finely corresponding to the inclination angle of the facing surface 21 of the rotating seal ring 20.

In addition, the facing surface 11 is provided with a curved surface-shaped part over the circumferential direction, and thus an effective facing region can be secured over the entire circumference in relation to the facing surface 21 of the rotating seal ring 20.

By the way, sealing requires contact between the surfaces or a region close to the extent of being fluid-sealable, that is, a facing region with some width in the radial direction. When the radius of curvature of the curved surface-shaped facing surface 11 of the stationary seal ring 10 is larger than, for example, the radius of curvature of the facing surface 21 of the rotating seal ring 20 that has a curved surface shape, the facing surface 11 and the facing surface 21 become closest at either the outermost diameter or the innermost diameter of the seal ring in the radial direction with the curved surface-shaped facing surface 11 of the stationary seal ring 10 and the facing surface 21 of the rotating seal ring 20 facing the curved surface-shaped facing surface 11 of the stationary seal ring 10 close to each other, the facing surface 11 and the facing surface 21 are largely separated from each other on the inner diameter side or the outer diameter side as compared with the closest part, and then it may be impossible to secure an effective facing region and perform sealing appropriately. However, the facing surface 21 of the rotating seal ring 20 in the present embodiment is formed as a flat surface orthogonal to the axial direction of the rotary shaft 1, the facing surface 11 of the stationary seal ring 10 is formed in a convex curved surface shape gradually separated from the rotating seal ring 20 toward the outer diameter end from the inner diameter end, and thus the closest point does not become the outermost diameter or the innermost diameter of the seal ring, the closest point is disposed on the outer diameter side as compared with the innermost diameter and the inner diameter side as compared with the outermost diameter of the seal ring, and close regions can be secured on both radial sides of the closest point. In addition, since the facing surface 11 of the stationary seal ring 10 is a curved surface formed along the facing surface 21 of the rotating seal ring 20, it is possible to reduce the average inter-surface distance between the facing surfaces 11 and 21 and effectively secure an effective facing region in the radial direction.

In addition, since the curved surface shape is formed for the facing surface 11 of the stationary seal ring 10, it is possible to secure an effective facing region with high responsiveness to the degree of deformation of the rotating seal ring 20.

In addition, since the dynamic pressure generation groove 13 is formed at the curved surface-shaped part of the facing surface 11 of the stationary seal ring 10, the function of dynamic pressure generation can be effectively exhibited in the effective facing region secured in the radial direction between the stationary seal ring 10 and the rotating seal ring 20.

In addition, the dynamic pressure generation groove 13 has the bottom surface 13a parallel to the surface shape of the land 12 of the facing surface 11, the plurality of dynamic pressure generation grooves 13 are radially formed at the same depth, and thus the function of dynamic pressure generation can be effectively exhibited regardless of the degree of deformation of the rotating seal ring 20.

In addition, the curved surface shape of the facing surface 11 of the stationary seal ring 10 has the minute step portion 30 in the radial direction from a microscopic viewpoint, and thus the sealing target liquid F is held in the step portion 30, a fluid film can be easily formed between the facing surface 11 of the stationary seal ring 10 and the facing surface 21 of the rotating seal ring 20, and high slidability and sealability can be ensured.

Second Embodiment

Next, the sliding component according to a second embodiment of the present invention will be described with reference to FIG. 7. It should be noted that configurations identical to those of the first embodiment will not be described below and the omission is to avoid redundancy.

Figure 7A:
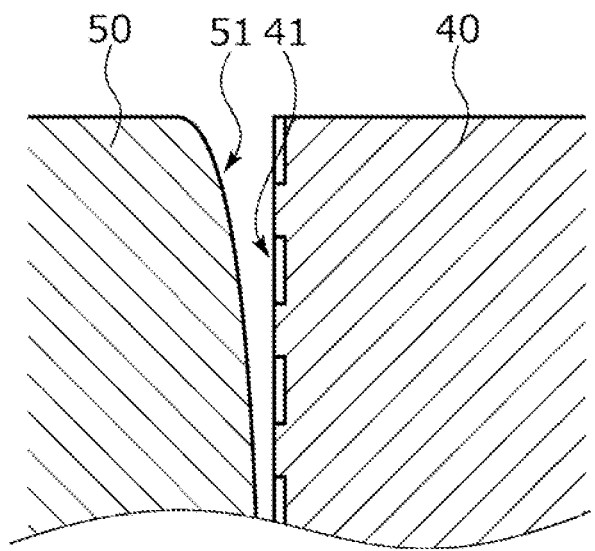
FIG. 7 is a partially enlarged cross-sectional view illustrating the relationship between rotating and stationary seal rings constituting a sliding component according to a second embodiment of the present invention.
Figure 7B:
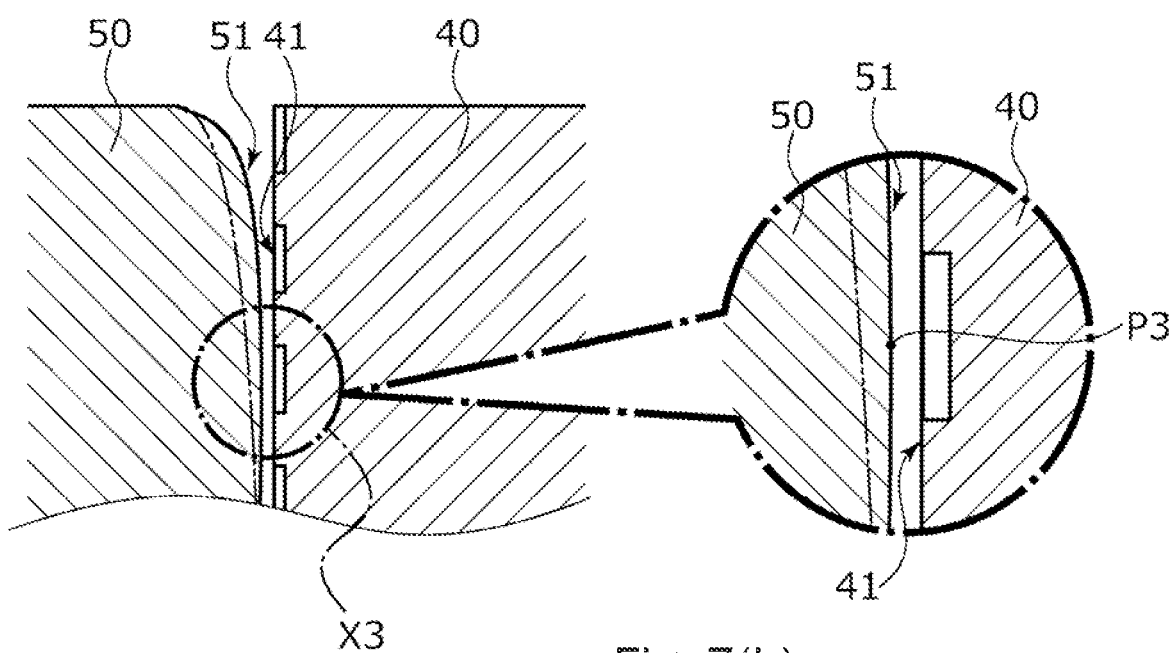

As illustrated in FIG. 7A, a facing surface 51 of a rotating seal ring 50 is formed into a curved surface shape convex in the facing direction and forms a curved surface portion. A facing surface 41 of a stationary seal ring 40 is a flat surface orthogonal to the axial direction. In a case where the rotating seal ring 50 is deformed during the rotation of the rotary shaft 1 as illustrated in FIG. 7B, the curved surface-shaped facing surface 51 is inclined with respect to the flat facing surface 41 of the stationary seal ring 40 and becomes close to the facing surface 41 in a region X3 around a closest part P3, a part of the facing surface 51 becomes almost parallel to the facing surface 41, and it is possible to secure an effective facing region in the radial direction.

Although embodiments of the present invention have been described above with reference to the drawings, the specific configurations are not limited to the embodiments and any changes or additions within the gist of the present invention are included in the present invention.

For example, although the facing surface 21 of the rotating seal ring 20 is a flat surface orthogonal to the axial direction of the rotary shaft 1 in the first embodiment, only one point is closest in the radial direction, even if the facing surface 21 of the rotating seal ring 20 has a concave curved surface shape, insofar as the facing surface 21 of the rotating seal ring 20 is larger in radius of curvature than the facing surface 11 of the stationary seal ring 10, and thus it is possible to effectively secure an effective facing region in the radial direction.

In another configuration, a rotating seal ring having an axially convex curved surface portion as in the second embodiment may face a stationary seal ring having an axially convex curved surface portion as in the first embodiment. In this case, sliding performance can be ensured regardless of the inclination angle between the facing surfaces of the stationary and rotating seal rings and damage attributable to stress concentration can be prevented.

In the first embodiment, the facing surface 11 of the stationary seal ring 10 has a convex curved surface shape gradually separated from the rotating seal ring from the inner diameter end toward the outer diameter end from the outer diameter end to the inner diameter end. However, the present invention is not limited thereto and the facing surface 11 of the stationary seal ring 10 may have a convex curved surface shape gradually separated from the rotating seal ring from the outer diameter end toward the inner diameter end from the outer diameter end to the inner diameter end of the facing surface 11. In addition, there is no need for the entire facing surface to constitute the curved surface portion. For example, the curved surface portion may be formed so as to extend to the radial middle portion from the outer or inner diameter end of the facing surface 11 and the curved surface portion may not be formed in the entire radial direction.

In addition, the curved surface portion formed on the facing surface 11 may be on both sides in the radial direction while leaving the flat surface radially extending to the middle portion between the outer and inner diameter ends of the facing surface 11 or either the outer diameter end or the inner diameter end of the facing surface 11.

In addition, the groove in the facing surface such as the dynamic pressure generation groove may be formed in the facing surface of the rotating seal ring instead of the facing surface of the stationary seal ring or may be formed in both the facing surface of the stationary seal ring and the facing surface of the rotating seal ring.

In addition, the groove in the facing surface of the stationary seal ring or the facing surface of the rotating seal ring may not be the dynamic pressure generation groove and may be a functional groove having another function such as a Rayleigh step.

In addition, the groove such as the dynamic pressure generation groove may be omitted insofar as the mechanical seal in which the sliding component is used is not in an aspect in which the facing surface of the stationary seal ring and the facing surface of the rotating seal ring are not in contact with each other.

In addition, the sliding component of the present invention is not limited to the inside-type mechanical seal that seals a sealing target fluid to leak from the outer peripheral side of the facing surface toward the inner peripheral side. The sliding component of the present invention can be used for an outside-type mechanical seal that seals a sealing target fluid to leak from the inner peripheral side of a facing surface toward the outer peripheral side.

In addition, although a liquid has been described as an example of the sealing target fluid sealed by the sliding component of the present invention, the liquid may be replaced with a gas. Further, although an example in which the sealing target fluid side is higher in pressure than the atmospheric side has been described, the fluid pressure relationship between the inner and outer diameter sides of the sliding component is not limited thereto and the pressures may be equal to each other.

In addition, the sliding component of the present invention can be used for a bearing such as a thrust bearing.

REFERENCE SIGNS LIST

1 Rotary shaft
2 Sleeve
4 Housing
5 Seal cover
7 Bellows
10 Stationary seal ring (first ring)
11 Facing surface (curved surface portion)
12 Land
13 Dynamic pressure generation groove (functional groove)
13a Bottom surface
14 Fluid introduction groove (functional groove)
15 Positive pressure generation groove (functional groove)
20 Rotating seal ring (second ring)
21 Facing surface
22 Corner portion
30 Step portion
31 Corner portion
40 Stationary seal ring (second ring)
41 Facing surface
50 Rotating seal ring (first ring)
51 Facing surface (curved surface portion)
F Sealing target liquid
P1 to P3 Closest part
X1 to X3 Region

The invention claimed is:

1. A sliding component comprising a first ring and a second ring which are provided with facing surfaces facing each other and relatively rotated upon a drive of a rotating machine,
wherein at least the first ring is provided with a curved surface portion formed in a convex shape and constituting at least a part of the facing surface of the first ring, and
the curved surface portion is constituted by a plurality of minute step portions radially formed along a circumferential direction of the facing surface of the first ring.

2. The sliding component according to claim 1, wherein the curved surface portion is formed over a circumferential direction of the facing surface of the first ring.

3. The sliding component according to claim 2, wherein the curved surface portion is formed at one or both of an outer diameter end and an inner diameter end of the first ring.

4. The sliding component according to claim 1, wherein the second ring is provided with a curved surface portion formed in a concave shape and constituting at least a part of the facing surface of the second ring, and the curved surface portion of the first ring is smaller in radius of curvature than the curved surface portion of the second ring.

5. The sliding component according to claim 1, wherein the first ring provided with the curved surface portion is disposed on a stationary side of the rotating machine.

6. The sliding component according to claim 1, wherein a functional groove is formed in one or both of the curved surface portion of the first ring and the facing surface of the second ring facing the curved surface portion of the first ring, the functional groove is opened at an outer diameter side or an inner diameter side of the sliding component.

7. The sliding component according to claim 6, wherein in the first ring provided with the functional groove, at least another functional groove is formed, the functional grooves have depths equal to each other and each has a bottom surface parallel to a surface shape of the curved surface portion, and the functional grooves overlap with each other in a radially directional view.

8. The sliding component according to claim 2, wherein the second ring is provided with a curved surface portion formed in a concave shape and constituting at least a part of the facing surface of the second ring, and the curved surface portion of the first ring is smaller in radius of curvature than the curved surface portion of the second ring.

9. The sliding component according to claim 2, wherein the first ring provided with the curved surface portion is disposed on a stationary side of the rotating machine.

10. The sliding component according to claim 2, wherein a functional groove is formed in one or both of the curved surface portion of the first ring and the facing surface of the second ring facing the curved surface portion of the first ring, the functional groove is opened at an outer diameter side or an inner diameter side of the sliding component.

11. The sliding component according to claim 10, wherein in the first ring provided with the functional groove, at least another functional groove is formed, the functional grooves have depths equal to each other and each has a bottom surface parallel to a surface shape of the curved surface portion, and the functional grooves overlap with each other in a radially directional view.

12. The sliding component according to claim 3, wherein the second ring is provided with a curved surface portion formed in a concave shape and constituting at least a part of the facing surface of the second ring, and the curved surface portion of the first ring is smaller in radius of curvature than the curved surface portion of the second ring.

13. The sliding component according to claim 3, wherein the first ring provided with the curved surface portion is disposed on a stationary side of the rotating machine.

14. The sliding component according to claim 3, wherein a functional groove is formed in one or both of the curved surface portion of the first ring and the facing surface of the second ring facing the curved surface portion of the first ring, the functional groove is opened at an outer diameter side or an inner diameter side of the sliding component.

15. The sliding component according to claim 14, wherein in the first ring provided with the functional groove, at least another functional groove is formed, the functional grooves have depths equal to each other and each has a bottom surface parallel to a surface shape of the curved surface portion, and the functional grooves overlap with each other in a radially directional view.

16. The sliding component according to claim 4, wherein the first ring provided with the curved surface portion is disposed on a stationary side of the rotating machine.

17. The sliding component according to claim 4, wherein a functional groove is formed in one or both of the curved surface portion of the first ring and the facing surface of the second ring facing the curved surface portion of the first ring, the functional groove is opened at an outer diameter side or an inner diameter side of the sliding component.

* * * * *